United States Patent

Jones, Jr.

[15] 3,680,283
[45] Aug. 1, 1972

[54] AIR DRYER ASSEMBLY FOR VEHICLE LEVELING SYSTEM

[72] Inventor: David L. Jones, Jr., Kettering, Ohio

[73] Assignee: General Motors Corporation, Detroit, Mich.

[22] Filed: Sept. 21, 1970

[21] Appl. No.: 73,929

[52] U.S. Cl. ..........................55/309, 55/302, 55/387
[51] Int. Cl. ..............................................B01d 53/14
[58] Field of Search.......................55/309–314, 387, 55/388, 301–302; 210/136; 34/80; 280/124 F

[56] References Cited

UNITED STATES PATENTS 3,426,508  2/1969  McGrath.....................55/309 X
3,464,186  9/1969  Hankison et al. ...........55/387 X Primary Examiner—Frank W. Lutter
Assistant Examiner—Vincent Gifford
Attorney—W. S. Pettigrew and J. C. Evans

[57] ABSTRACT

An air dryer assembly having an open ended dessicant cartridge located centrally of an outer cylinder forms a bypass chamber around the cartridge. The cylinder includes an inlet and an outlet to the chamber adapted to be connected between an air spring for a vehicle and its pressure source for air flow through the bypass chamber when the vehicle is level. During a pump-up phase an inlet valve is operable to draw outside air through the cartridge to dry the outside air for use in the system. The dryer assembly further includes an exhaust valve operable to discharge excessive air from the air spring to counterflow through the dessicant cartridge for removing moisture therefrom during a regenerative phase that occurs each time that the vehicle is unloaded.

3 Claims, 3 Drawing Figures

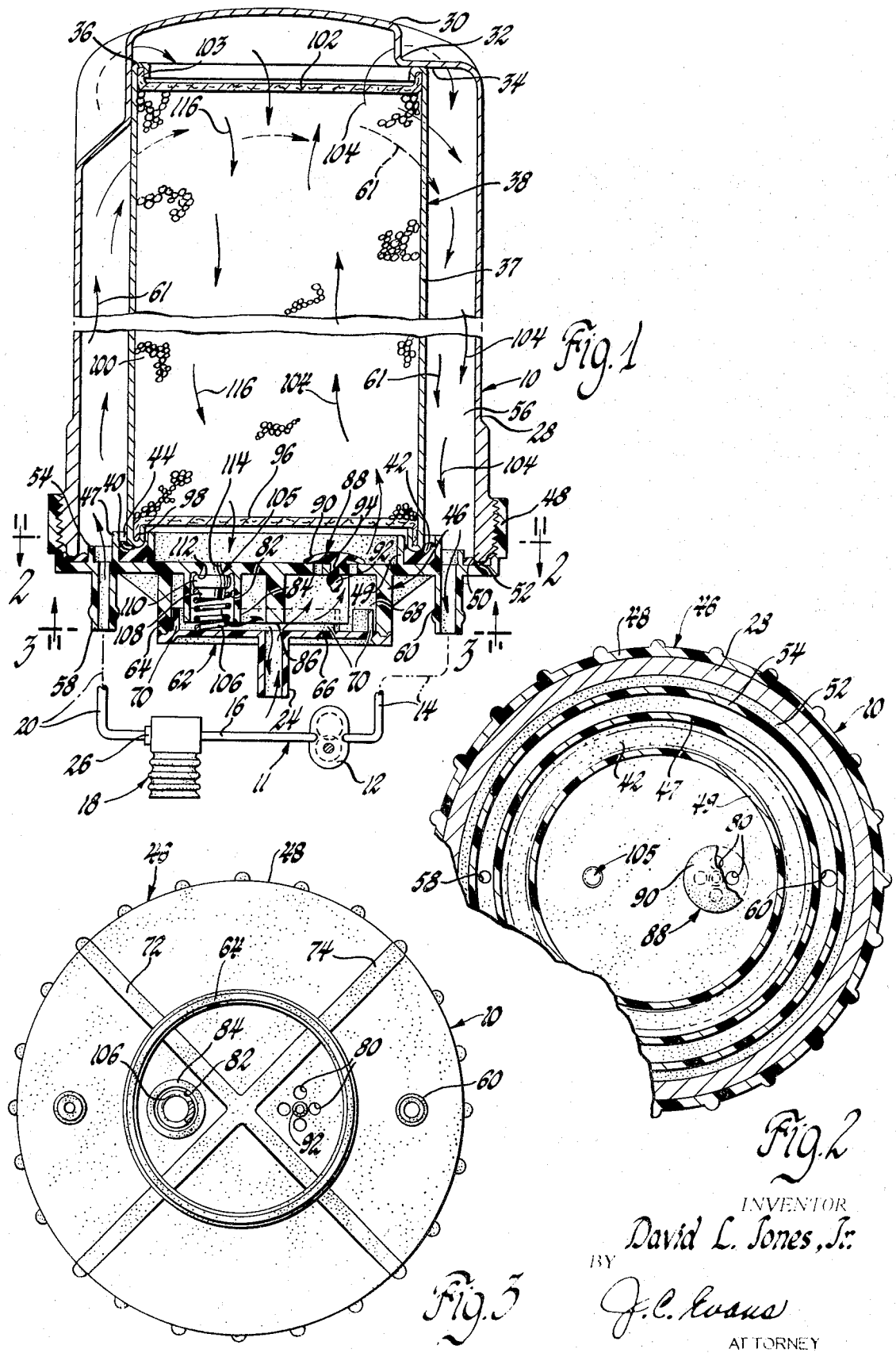

AIR DRYER ASSEMBLY FOR VEHICLE LEVELING SYSTEM

This invention relates to air dryer assemblies and more particularly to air dryer assemblies for removing moisture from outside air pumped to an air spring type vehicle leveling system.

In automatic vehicle leveling systems one problem is that of moisture condensation in conduits between a pressure source and air springs in the system. Such condensation of moisture can freeze under low ambient conditions to block communication between the pressure source and the air spring.

A further problem is that such systems include valving components that can be plugged by moisture condensation. Additionally, moisture in the system can effect various operative components such as mechanically operated compressors or shock absorbers that are combined with air springs.

Accordingly, an object of the present invention is to remove moisture from air that is directed into a semi-closed vehicle leveling system each time it is charged and to do so by means including a dessicant cartridge which is partially regenerated each time that the vehicle is unloaded.

Still another object of the present invention is to provide an improved air dryer assembly that includes a bypass passageway adapted to be connected in a vehicle leveling system for directing air flow between a pressure source and an air spring in the system during level operation and that further includes valve means for controlling air flow through a dessicant cartridge in the assembly in a manner that removes water from air passing into the system during a pump-phase of operation and that removes moisture from the dessicant cartridge during an exhaust-phase of operation.

Still another object of the present invention is to provide an improved, compact air dryer assembly including an outer cylindrical member having an open ended dessicant cartridge concentrically arranged therein and wherein one end of the dessicant cartridge and one end of the outer cylindrical member are closed by a common closure member that has inlet and exhaust valve means therein for controlling air flow through the dessicant cartridge, the dessicant cartridge communicating with an annular chamber formed between the outer cylindrical member and the dessicant cartridge and wherein the annular chamber is formed to define a shunt passageway around said dessicant cartridge between an inlet and an outlet conduit adapted to be serially connected with a pressure source and a pressurizable device for supplying dry air from the source to the device without passage through the cartridge.

Further objects and advantages of the present invention will be apparent from the following description, reference being had to the accompanying drawings wherein a preferred embodiment of the present invention is clearly shown.

FIG. 1 is a view in vertical sectional view of the dryer assembly of the present invention;

FIG. 2 is a horizontal sectional view taken along the line 2—2 of FIG. 1; and

FIG. 3 is a horizontal sectional view taken along the line 3—3 of FIG. 1.

Referring now to the drawing, in FIG. 1 an air dryer assembly 10 is illustrated that is adapted to be connected in an automatic vehicle leveling system 11 of the type disclosed in co-pending United States application Ser. No. 73,963 filed Sept. 21, 1970.

For purposes of describing the present invention it is only necessary to point out that the leveling system includes a compressor 12 having its inlet connected to the air dryer assembly by a conduit 14 and an outlet connected by a conduit 16 to a variable volume air spring 18 that is adapted to be connected between the sprung and the unsprung mass of a vehicle.

An outlet from the air spring is connected by a conduit 20 to the air dryer assembly 10 to complete a semi-closed vehicle leveling system 11 which has air supplied there through a tube 24 to the dryer assembly 10.

In operation the system includes a pump-up phase wherein air is directed through the tube 24 and thence through the conduit 14 to the compressor 12 which discharges high pressure air through the conduit 16 into the spring 18 until a predetermined level relationship occurs between the sprung and the unsprung mass of the vehicle.

During the pump-up phase a valve assembly 26 on the air spring 18 remains closed. When the vehicle is level the valve assembly 26 opens to allow return flow through the conduit 20 back to the air dryer assembly 10 for return flow through the conduit 14 back to the compressor 12.

The leveling system 11 further includes an exhaust phase of operation wherein the valve assembly 26 is conditioned to exhaust air from the spring 18 through the conduit 20 into the air dryer assembly 10 thence for discharge through the tube 24.

When the vehicle is unloaded an the vehicle is shut down, compressor 12 does not operate and the exhaust flow will continue as long as the valve assembly 26 is maintained open because the sprung mass of the vehicle is raised to high above the unsprung mass thereof. Eventually the exhaust of air from the spring 18 will cause the sprung mass to move down toward the unsprung mass to a level position at which point the valve assembly 26 closes.

Additionally the system 11 includes a level phase of operation wherein air continually passes under the control of valve assembly 26 from the compressor 12 through the conduit 16, the spring 18, the conduit 20 thence through the air dryer assembly 10 without being drawn through or exhausted through the tube 24. From conduit 20 and assembly 10 air returns through the inlet conduit 14 to the compressor 12 thereby to complete a closed fluid circuit.

In order to accomplish the aforesaid phases of operation, the air dryer assembly 10 includes an outer cylindrical housing 28 opened at one end and closed by an integral cap 30 at its opposite end. The cap 30 includes a plurality of circumferentially located indentations 32 thereon which serve to define a plurality of circumferentially located support seats 34 for the rolled over annular end 36 of a cylindrical housing 37 for a dessicant cartridge 38.

The dessicant cartridge 38 has an opposite open end thereon defined by a rolled over edge 40 which sealingly engages an annular resilient O-ring element 42 supported within an annular groove 44 in the inside face of an end closure 46 formed by spaced flanges 47, 49.

The closure 46 includes an internally threaded outer flange 48 thereon which is threadably received on a threaded open end 50 of the outer cylindrical member 28.

The threaded end 50 is located in sealing engagement with an annular gasket 52 which is supported by the end closure member 46 between the outer flange 48 thereon and a radially inwardly located, continuously formed, gasket retaining flange 54 thereon.

The outside diameter of the cylindrical dessicant cartridge 38 is less than the inside diameter of the outer cylindrical member 28 and together they define an annular space 56 completely around the dessicant cartridge 38 between the open ends 36, 40 thereof.

This space constitutes a shunt passageway between an inlet tube 58 on the closure 46 which is adapted to be connected to the return conduit 20 and an outlet tube 60 on the closure 46 which is adapted to be connected to the compressor inlet conduit 14.

The air flow path during the level operation is through the inlet tube 58 thence upwardly in the annular space 56 and around the outside surface of the dessicant cartridge 38 thence downwardly and around the space 56 to the outlet tube 60. This flow path is marked by reference numeral 61 and is shown in solid and dotted arrows in FIG. 1 and represents a shunt path around the dessicant cartridge 38.

The air dryer assembly 10 further includes an improved valve control assembly 62 which is in part defined by a depending annular flange 64 on the end closure 46 which is closed by a cover plate 66 that has a peripheral edge portion thereon sonically welded to the bottom edge of the annular flange 64. Together the cover 66 and flange 64 define a valve control space 68 on the underside of the end closure 46 in alignment with the bottom open end of the cylindrical dessicant cartridge 38 defined by the rolled-over edge 40.

In this embodiment the air flow tube 24 is formed as an integral depending part of the cover 66.

Additionally, the cover 66, as best seen in FIG. 2, includes a plurality of spaced circumferential guide shoulders 70 thereon which locate the cover 66 in its seated relationship with the edge of the flange 64.

As best seen in FIG. 3 the end closure 46 includes a pair of crossed reinforcing ribs 72, 74 which separate a plurality of small diameter inlet openings 80 therethrough from an outlet opening 82 therein which is defined by a depending cylindrical tubular extension 84 on the end closure 46.

The intersection 86 of the reinforcing ribs 72, 74 is located in spaced relationship immediately above the passageway through tubular member 24.

The inlet openings 80 are covered by an umbrella valve 88 which includes a flanged head 90 of flexible, resilient material bent downwardly in spring biased relationship with the upper surface of the end closure 46 so as to seal the openings 80 against flow from within the cartridge 38 outwardly through the openings 80.

The umbrella valve 88 includes a depending base 92 thereon which fits through an opening 94 in the end closure 46 to locate a larger diameter end thereon on the underside of the end closure 46 so as to interlockingly connect the valve 88 in place thereon.

The inlet valve 88 will respond to pump-up phase of operation wherein the compressor 12 draws air from atmosphere for charging the air spring 18. More particularly, the pump-up phase includes drawing air from the atmosphere through the tube 24 into the space 68. Thence across the valve 88 which will have the flexible flanged head 90 thereon raised above and away from the end closure 46.

The air flow will then pass through a porous filter disc 96 that extends across the full planar extent of the open bottom end of the cylindrical member 38. It has a peripheral edge 98 thereon held in place by rolled over edge 40 of the cartridge 38.

Within the cartridge 38 is located a charge 100 of dessicant material preferably a charge of 6–16 mesh silica gel. This material removes water condensate from outside air passing therethrough.

During the pump-up phase of operation, the air once having passed through the cylindrical dessicant cartridge 38 passes across a porous dessicant retaining filter disc 102 that extends across the full planar extent of the upper open end of the cartridge 38. It has the peripheral edge 103 thereof locked in place to the cartridge 38 by the rolled over edge 34.

This inlet air, which is marked by arrows 104, passes through passageways between the indentations 32 at the upper end of the outer cylindrical member 28. Air then flows downwardly through the annular space 56 and out the outlet tube 60 thence through the conduit 14 to the inlet of the compressor 12. From this point high pressure air is discharged through the inlet conduit 16 into the air spring 18 where it is trapped by the valve assembly 26 which is closed during the pump-up phase. This defined air flow path will remain during the time that it is required to draw enough air from atmosphere into the system to raise the pressure of the air spring 18 sufficiently to level a vehicle.

During this pump-up phase of operation the inlet air is directed through the dessicant cartridge 38 and moisture is separated from the air whereby air passing into the air spring will have a dryness which will prevent moisture condensate in the system when it is operated, for example, at temperatures down to −20° F. The air will maintain this quality of dryness following the pump-up phase since it is shunted around the cartridge. During the level phase of operation there is little or no inlet or exhaust of air through tube 24 and the system is thus closed during this operation.

Another aspect of the present invention occurs during an exhaust phase of operation of leveling system 11 wherein the vehicle is unloaded and the valve assembly 26 is conditioned to cause flow of excess air in the air spring 18 back through the air dryer assembly 10 and then through the tube 24 back to atmosphere. This reverse flow reduces the pressure in the air spring to the point where the supported vehicle chassis is returned to its desired predetermined height relationship following unloading.

More particularly, during the exhaust phase the valve 26 opens and allows flow of excessive air from the spring 18 through the conduit 20, the inlet tube 58 thence into the annular opening 56. During this phase of operation the compressor 12 is maintained off and a build-up of pressure will occur in the annular space 56. Hence, air will flow from the fitting 58 through the annular space 56 to the top of the outer cylinder 28 and thence flow across the filter disc 102 and through the dessicant material 100 hence through a relief valve assembly 105 and the tubular extension 24 back to atmosphere.

The relief valve assembly 105 more particularly is formed in part by a tubular extension 84 on end closure 46 and depending downwardly therefrom to have an opened end thereon located in close spaced relationship with the cover 66 as is best seen in FIG. 1. The tubular extension 84 serves as a guide for relief valve spring 106 that is supported at one end thereof by the cover 66 and at the opposite end thereof is fit on a spring guide portion 108 of a relief valve 110 which is biased against an annular seat 112 around an exhaust opening 114 in the end closure 46.

During the exhaust phase, when the pressure builds up within the cylindrical member 28 and across the dessicant material 100 between the opposite open ends of the cartridge 38 the relief valve assembly 105 will open to allow a back flow pattern shown by the downwardly flowing lines 116 through the dessicant material 100.

This flow of air tends to remove moisture previously absorbed in the dessicant material 100 and thence the exhaust phase of operation serves as a partial regenerative phase of operation in the system 11 wherein part of previously accumulated moisture in the dessicant cartridge 38 is removed therefrom each time that the vehicle is unloaded.

Thus there is a two-way air flow through tube 24; in during a pump-phase; out during an exhaust phase. During these phases the system is opened in order to build-up pressure or exhaust excess air. This flow make-up and exhaust make the leveling system of the type referred to as being semi-closed.

While the embodiments of the present invention, as herein disclosed, constitute a preferred form, it is to be understood that other forms might be adopted.

What is claimed is:

1. An air dryer system comprising: an air spring having an exhaust port, a compressor having an inlet, a housing having an inlet and an outlet therefrom, said housing inlet connected to the exhaust port of the air spring, said housing outlet connected to the inlet of the compressor operated to inflate the air spring, a dessicant cartridge located within said housing including open ends, means communicating one open end of the dessicant cartridge with atmosphere including an inlet check valve, a space between said cartridge and said housing communicating the other open end of said dessicant cartridge with the outlet from said housing to define a flow path from atmosphere through the dessicant cartridge to the air compressor for removing moisture from intake air through said check valve prior to passage into the compressor, said space between said cartridge and said housing defining a shunt between said housing inlet and outlet for the passage of dry air directly from air spring to the air compressor when the vehicle is level, and means defining an exhaust path for air flow from the air spring to atmosphere including the inlet to said housing, the space between the cartridge and said housing, and a relief valve located in communication with said one open end of said cartridge whereby when the vehicle is unloaded dry air from the air spring is reverse flowed through said dessicant cartridge for partially regenerating said cartridge by sweeping moisture therefrom for exhaust to atmosphere.

2. An air dryer assembly comprising: an outer cylindrical housing having an inlet and an outlet, an inner cylindrical housing spaced with respect to the outer cylindrical housing to define an annular space therebetween, said inner cylindrical housing having the opposite ends thereof open, an atmospheric connector communicating with one open end of said inner cylindrical housing, an intake check valve controlling flow of fluid from atmosphere to the one open end of the cartridge, moisture dessicant within said inner housing for removing moisture from outside air from the inlet check valve and the one open end of said inner cylindrical housing and out the other open end of said inner cylindrical housing, said other open end communicating with the space between the inner and outer cylindrical housings for passage of the dried air through the outlet, said space between the inner and outer cylindrical housings serving as a direct shunt passageway around the dessicant between said inlet and outlet from said outer cylindrical member, a relief valve means located between atmosphere and the one open end of said inner cylindrical housing for controlling the pressure within the outer cylindrical housing and for defining a backflow path from the space between said inner and outer cylindrical housings through the dessicant to atmosphere whereby moisture collected during intake of air through the inlet check valve can be purged from the dessicant during a regenerative phase of operation.

3. An air dryer assembly comprising: an outer cylindrical housing having a closed end and an open end, a closure member for said open end including an inlet and an outlet, an inner cylindrical housing spaced with respect to the outer cylindrical housing to define an annular space therebetween, said inner cylindrical housing having the opposite ends thereof open, said outer cylindrical housing having end indentations supporting one open end of said inner housing, said closure member for said cylindrical housing having seal means thereon engaging one open end of said inner housing, an atmospheric connector on said closure member communicating with said one open end of said inner cylindrical housing, an intake check valve on one said closure member controlling flow of fluid from atmosphere to the one open end of the inner housing, a moisture dessicant within said inner housing for removing moisture from air passing from the inlet check valve and the inlet of said inner cylindrical housing and out the other open end of said inner cylindrical housing, said other open end communicating with the space between the inner and outer cylindrical housings for passage of the dried air through the outlet, said space between the inner and outer cylindrical housings serving as a direct shunt passageway around the dessicant between said inlet and outlet, a relief valve means on said closure member located between atmosphere and the one open end of said inner cylindrical housing for controlling the pressure within the outer cylindrical housing and for defining a backflow path from the space between said inner and outer cylindrical housings through the dessicant to atmosphere whereby moisture collected during intake of air through the inlet check valve can be purged from the dessicant during a regenerative phase of operation.

* * * * *

PO-1050
(5/69)

UNITED STATES PATENT OFFICE
CERTIFICATE OF CORRECTION

Patent No. 3,680,283          Dated August 1, 1972

Inventor(s) David L. Jones, Jr.

It is certified that error appears in the above-identified patent and that said Letters Patent are hereby corrected as shown below:

Column 1, line 15, "effect" should be -- affect --;
Column 2, line 14, "there" should be -- thereto --;
Column 2, line 34, "an" should be -- and --; and
Column 6, line 48, "on one said" should be -- on one side of said --.

Signed and sealed this 6th day of March 1973.

(SEAL)
Attest:

EDWARD M. FLETCHER, JR.          ROBERT GOTTSCHALK
Attesting Officer                 Commissioner of Patents